(12) United States Patent
Kajitani

(10) Patent No.: US 6,877,715 B2
(45) Date of Patent: Apr. 12, 2005

(54) VACUUM REGULATING VALVE

(75) Inventor: Masao Kajitani, Noda (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/418,067

(22) Filed: Apr. 18, 2003

(65) Prior Publication Data
US 2003/0197141 A1 Oct. 23, 2003

(30) Foreign Application Priority Data
Apr. 18, 2002 (JP) ......................................... 2002-116582

(51) Int. Cl.$^7$ ............................................. F16K 47/00
(52) U.S. Cl. ..................................... 251/63.5; 251/122
(58) Field of Search ............................... 251/63.5, 122, 251/63.6, 62, 63

(56) References Cited

U.S. PATENT DOCUMENTS

| | | | | | |
|---|---|---|---|---|---|
| 4,431,159 A | * | 2/1984 | Stubbs | ...................... | 251/63.6 |
| 5,848,608 A | * | 12/1998 | Ishigaki | ........................ | 251/60 |
| 5,915,410 A | * | 6/1999 | Zajac | ......................... | 251/61.4 |
| 6,321,780 B1 | * | 11/2001 | Iwabuchi | ...................... | 251/321 |
| 6,494,229 B1 | * | 12/2002 | Kajitani | ..................... | 251/122 |
| 6,668,854 B1 | * | 12/2003 | Fukuda | ....................... | 251/63.5 |

FOREIGN PATENT DOCUMENTS

| | | |
|---|---|---|
| JP | 10-252942 | 9/1998 |
| JP | 2000-148254 | 5/2000 |
| JP | 2000-163136 | 6/2000 |
| JP | 2001-263532 | 9/2001 |
| JP | 2002-89736 | 3/2002 |
| JP | 2002-89737 | 3/2002 |

* cited by examiner

Primary Examiner—John Bastianelli
(74) Attorney, Agent, or Firm—Paul A. Guss

(57) ABSTRACT

A chamber port to which a vacuum chamber is connected and a pump port to which a vacuum pump is connected are formed on a valve body of a vacuum regulating valve. A valve plug includes a plate and a nose which is connected to the plate by screw members, and closes the chamber port by a pressure fluid. The maximum outer diameter of the nose is smaller than the inner circumferential diameter of the chamber port. The nose is detached through the chamber port.

16 Claims, 9 Drawing Sheets

VACUUM REGULATING VALVE

BACKGROUND OF THE INVENTION

1. Field of the Invention

The present invention relates to a vacuum regulating valve which is connected, for example, between a vacuum chamber and a vacuum pump to control flow rate so that the pressure in the vacuum chamber is gradually reduced to be a vacuum pressure.

2. Description of the Related Art

For example, the internal pressure of a vacuum chamber of an apparatus for processing a semiconductor wafer or the like may be lowered to a vacuum pressure by using a vacuum pump. In such a procedure, if the gas in the vacuum chamber at atmospheric pressure or high pressure is suddenly evacuated, a large amount of the gas temporarily flows. As a result, some gas turbulence may be generated in the vacuum chamber, and some produced material or the like on the inner wall surface of the vacuum chamber are peeled off. Then, the produced material may be adhered to the semiconductor wafer or the like, or scattered in fluid passages.

In view of the above, a vacuum regulating valve is adopted to avoid a sudden flow rate change. In the vacuum regulating valve, a valve plug is provided in a passage between a vacuum chamber and a vacuum pump for opening/closing the passage by the action of the pressure fluid. A tapered section provided on the valve plug is used to control the flow rate of the fluid flowing through the flow passage (see, for example. Japanese Laid-Open Patent Publication No. 10-252942).

As shown in FIGS. 8 and 9, the conventional vacuum regulating valve 1 comprises a valve seat 4 formed in a flow passage in a body 2 between a first port 3a connected to an unillustrated vacuum chamber and a second port 3b connected to an unillustrated vacuum pump, and a main valve body 5 for opening/closing the passage between the first port 3a and the second port 3b. The main valve body 5 includes a first valve plug 7 connected to a shaft 6, and a second valve plug 9 connected to the lower surface of the first valve plug 7 by an attachment screw 8. The main valve body 5 is seated on or separated from the valve seat 4 by displacing the shaft 6 connected to the main valve body 5 in the axial direction under the action of the pressure fluid.

The valve seat 4 is formed on the upper surface of the body 2 on which the lower surface of the first valve plug 7 is seated. A straight surface 10 and a tapered surface 11 are formed on the outer circumferential surface of the second valve plug 9. The straight surface 10 extends by a predetermined length substantially in parallel to the axis of the second valve plug 9. The tapered surface 11 is diametrally reduced while being inclined by a predetermined angle in a direction toward the opening of the first port 3a of the valve seat 4 from the end position of the straight surface 10. The straight surface 10 abuts against the inner circumferential surface 12 of the first port 3a.

Further, a lower portion of the first valve plug 7 is formed such that the diameter is expanded radially outwardly. An annular O-ring 13 is installed between the first valve plug 7 and the outer circumferential surface of the second valve plug 9. The air-tightness is retained by the O-ring 13 when the main valve body 5 is seated on the valve seat 4.

In the conventional vacuum regulating valve 1, for example, when the second valve plug 9 of the main valve body 5 is periodically maintained or exchanged, the second valve plug 9 cannot be taken out through the first port 3a to the outside of the body 2 even by detaching the attachment screw 8 in order to release the second valve plug 9 from the first valve plug 7. This is because the second valve plug 9 adjacent to the O-ring 13 has the maximum outer diameter X which is larger than the inner diameter Y of the first port 3a.

Therefore, to take the second valve plug 9 out of the body 2, a complicated operation is necessary such that the entire main valve body 5 including the second valve plug 9 is taken out through an upper portion of the body 2 and then the main valve body 5 is detached from the second valve plug 9. This operation is also extremely time-consuming. Therefore, operation efficiency is unsatisfactory when the main valve body 5 is maintained.

SUMMARY OF THE INVENTION

A general object of the present invention is to provide a vacuum regulating valve which makes it possible to improve the maintenance performance of a valve plug. The valve plug controls the flow rate of a fluid flowing through a communication passage by being seated on a valve seat and being separated from the valve seat.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
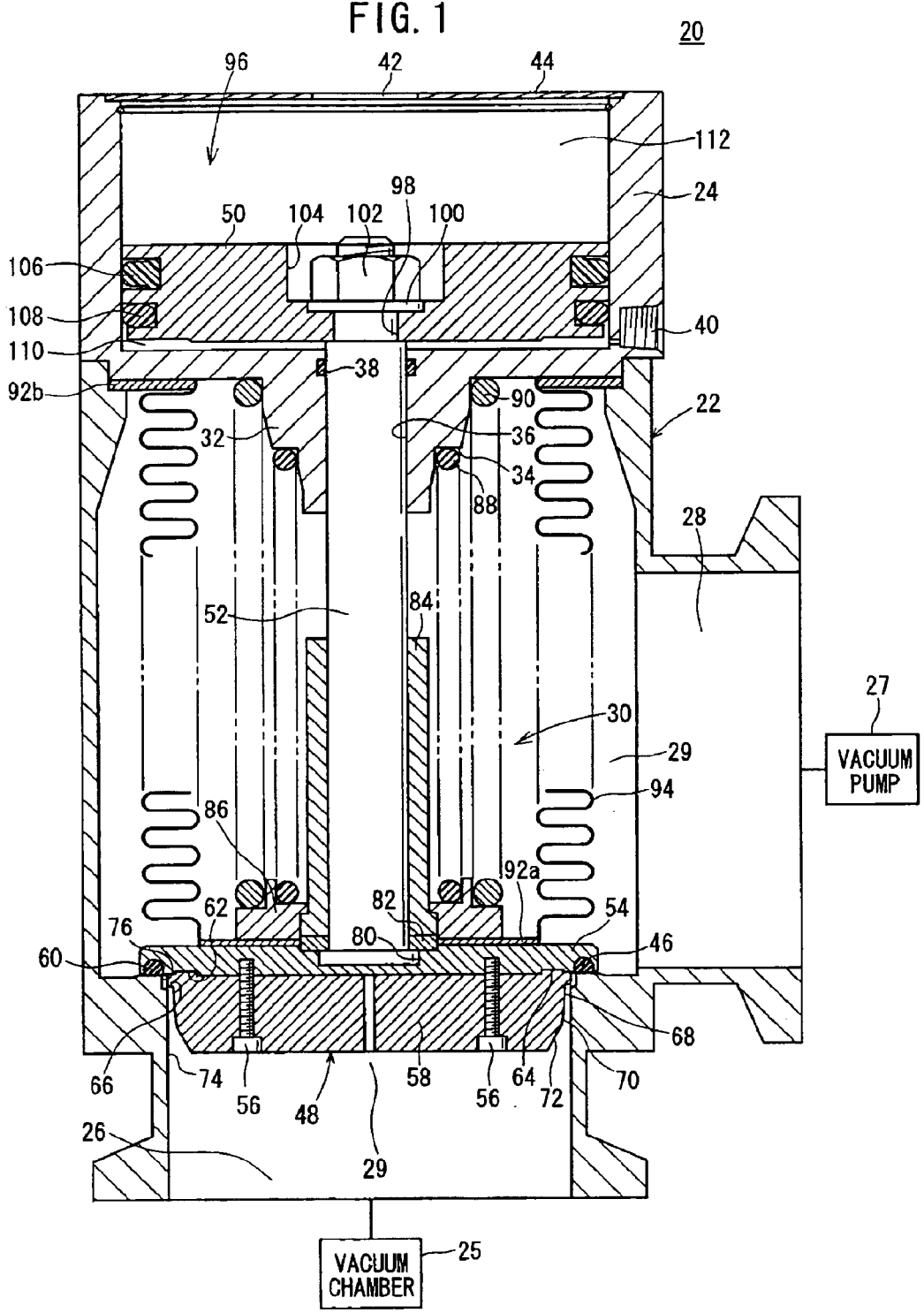
FIG. 1 is a vertical sectional view illustrating a vacuum regulating valve according to an embodiment of the present invention.

With reference to FIG. 1, reference numeral 20 indicates a vacuum regulating valve according to an embodiment of the present invention.

The vacuum regulating valve 20 comprises a substantially cylindrical valve body 22, a bonnet 24 connected to an upper portion of the valve body 22, a chamber port (first port) 26 formed at a lower portion of the valve body 22 and connected to a vacuum chamber 25, a pump port (second port) 28 formed on a side surface of the valve body 22 substantially perpendicularly to the axis and connected to a vacuum pump 27, and a valve mechanism 30 arranged in the valve body 22 and opening/closing a communication passage 29 between the chamber port 26 and the pump port 28.

A projection 32 is formed at a lower portion of the bonnet 24 which faces the interior of the valve body 22 The projection 32 has a predetermined length in a direction toward the valve body 22. An annular step section 34 is formed at a substantially central portion in the axial direction of the projection 32. A first spring member 88 is fastened to the step section 34 as described later on.

A through-hole 36 is formed through the projection 32. An upper portion of a shaft 52 is inserted displaceably in the axial direction into the through-hole 36 as described later on. A seal member 38 is installed to an annular groove formed in the through-hole 36. The seal member 38 abuts against the outer circumferential surface of the shaft 52 to retain the air-tightness in the valve body 22 and the bonnet 24.

A fluid supply port 40 is formed on the lower side surface of the bonnet 24, and communicates with the interior of the bonnet 24. The pressure fluid is supplied into a piston chamber 96 via an unillustrated fluid tube as described later on.

An upper portion of the bonnet 24 is closed by a thin plate-shaped lid 44 which has a ventilation hole 42 formed at a substantially central portion thereof. The ventilation hole 42 of the lid 44 is provided in order to discharge the fluid on the upper surface of a piston 50 in the piston chamber 96 to the atmospheric air when the piston 50 is displaced in the axial direction as described later on.

The valve mechanism 30 comprises a valve plug 48, the piston 50, and the shaft 52. The valve plug 48 is displaceable in the axial direction of the valve body 22, and closes a valve seat 46 formed in the vicinity of the chamber port 26 of the valve body 22. The piston 50 is displaceable under the action of the pressure fluid. The shaft 52 connects the valve plug 48 and the piston 50.

The valve plug 48 includes a disk-shaped plate 54 (main body section), a nose 58, and a seal member 60. The disk-shaped plate 54 is connected to a lower portion of the shaft 52. The nose 58 is connected to the lower surface of the plate 54 by screw members 56. The seal member 60 is installed to an annular groove on the lower surface of the plate 54 to abut against the valve seat 46 of the plate 54.

The valve seat 46 is formed at a position facing the lower surface of the plate 54 of the valve plug 48 of the valve body 22. When the plate 54 is displaced downwardly together with the shaft 52, the plate 54 is seated on the seat 46 to close the chamber port 26.

Figure 2:
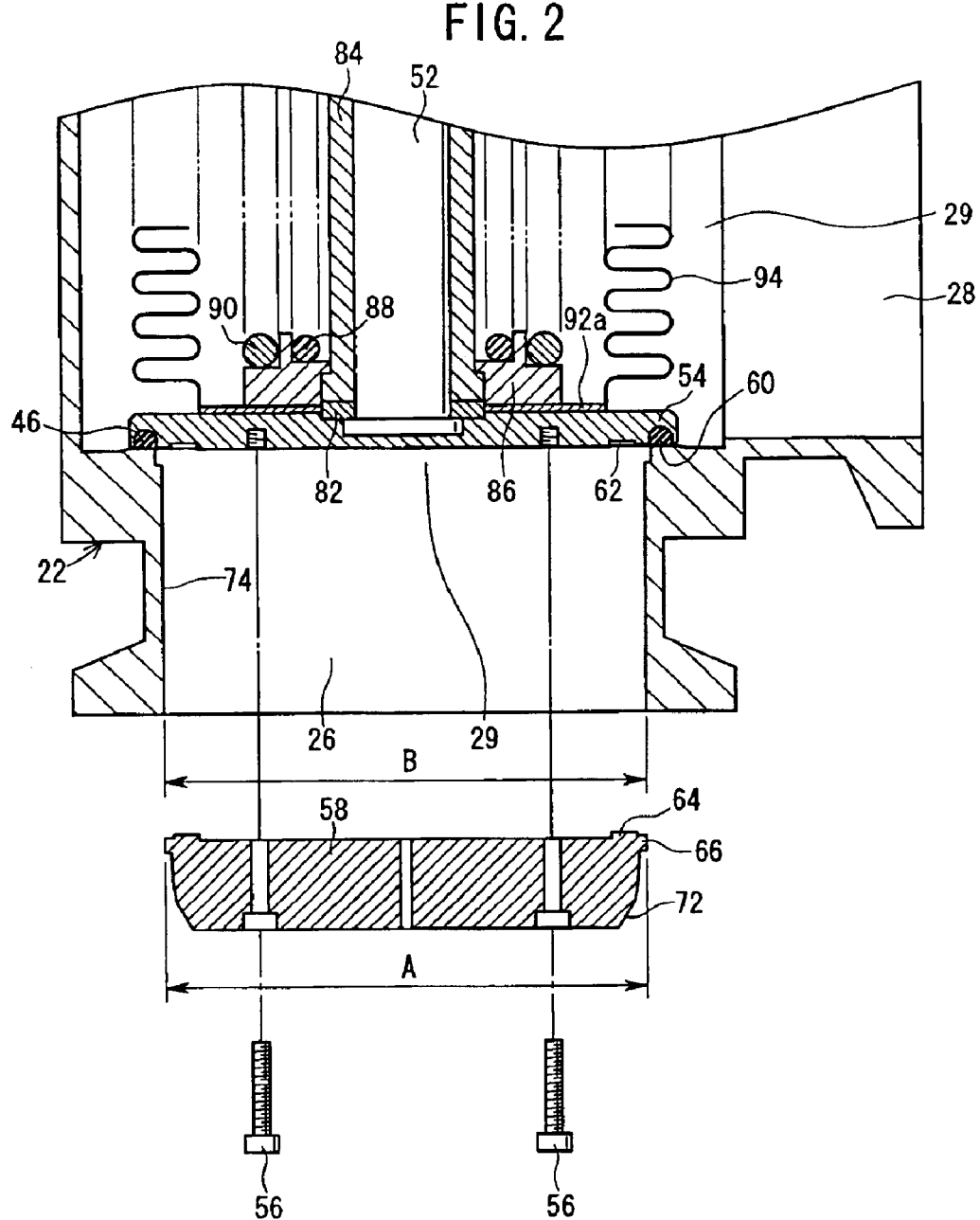
FIG. 2 is, with partial omission, an exploded vertical sectional view illustrating a valve plug of the vacuum regulating valve shown in FIG. 1.

The nose 58 is connected to the lower surface of the plate 54 by the plurality of the screw members 56. As shown in FIG. 2, the nose 58 can be detached downwardly from the lower surface of the plate 54 by screwing the screw members 56. In this arrangement, the maximum outer circumferential diameter A of the nose 58 is smaller than the inner circumferential diameter B of the chamber port 26 (A<B). Therefore, the nose 58 can be detached out of the valve body 22 through the chamber port 26.

As a result, the nose 58 can be attached to or detached from the inside of the valve body 22 without disassembling the valve body 22 and the valve mechanism 30 (see FIG. 1). Therefore, it is possible to easily perform the maintenance operation of the valve plug 48.

An engaging groove 62 recessed by a predetermined depth is formed on the lower surface of the plate 54. An engaging projection 64 is formed at a position facing the engaging groove 62 on the upper surface of the nose 58.

When the nose 58 is installed to the plate 54, the engaging projection 64 is engaged with the engaging groove 62. Accordingly, it is possible to easily position the nose 58.

The outer circumferential surface of the nose 58 has a shape such that the diameter is gradually reduced toward the vacuum chamber 25 to which the chamber port 26 is connected.

Figure 3:
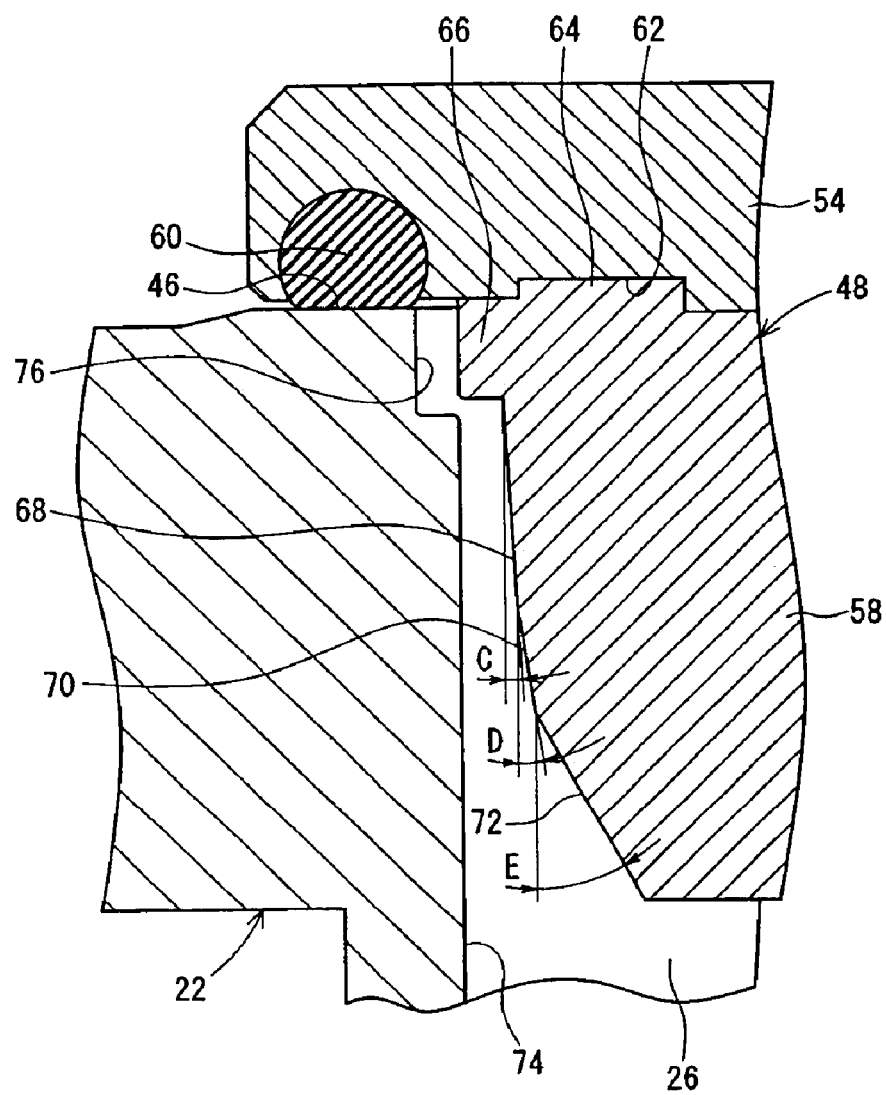
FIG. 3 is, with partial omission, a vertical sectional view illustrating the valve plug of the vacuum regulating valve shown in FIG. 1.

In particular, as shown in FIG. 3, an annular projection (straight section) 66 protruding radially outwardly is formed on the outer circumferential surface on the upper surface connected to the plate 54. On the outer circumferential surface, a first tapered section 68, a second tapered section 70, and a third tapered section 72 are further formed. The first tapered section 68 is diametrally reduced by a predetermined length from the annular projection 66 and is gradually inclined by a predetermined angle C toward the chamber port 26. The second tapered section 70 is gradually inclined by a larger angle of inclination D from the first tapered section 68 toward the chamber port 26. The third tapered section 72 is gradually inclined by a still larger angle of inclination E from the second tapered section 70 toward the chamber port 26 (C<D<E).

An annular recess 76 is formed on the inner wall surface 74 of the chamber port 26 at a position at which the annular recess 76 faces the annular projection 66 in the valve-closed state when the valve plug 48 is seated on the valve seat 46. The diameter of the annular recess 76 is expanded radially outwardly from the inner wall surface 74. That is, the outer circumferential surface of the nose 58 constitutes a plurality of steps (multistep) in which the diameter is gradually reduced in the direction toward the vacuum chamber 25 connected to the chamber port 26. In other words, the distance between the outer circumferential surface of the nose 58 and the inner wall surface 74 of the chamber port 26 is gradually increased in the direction toward the vacuum chamber 25 along with the nose 58.

Figure 4:
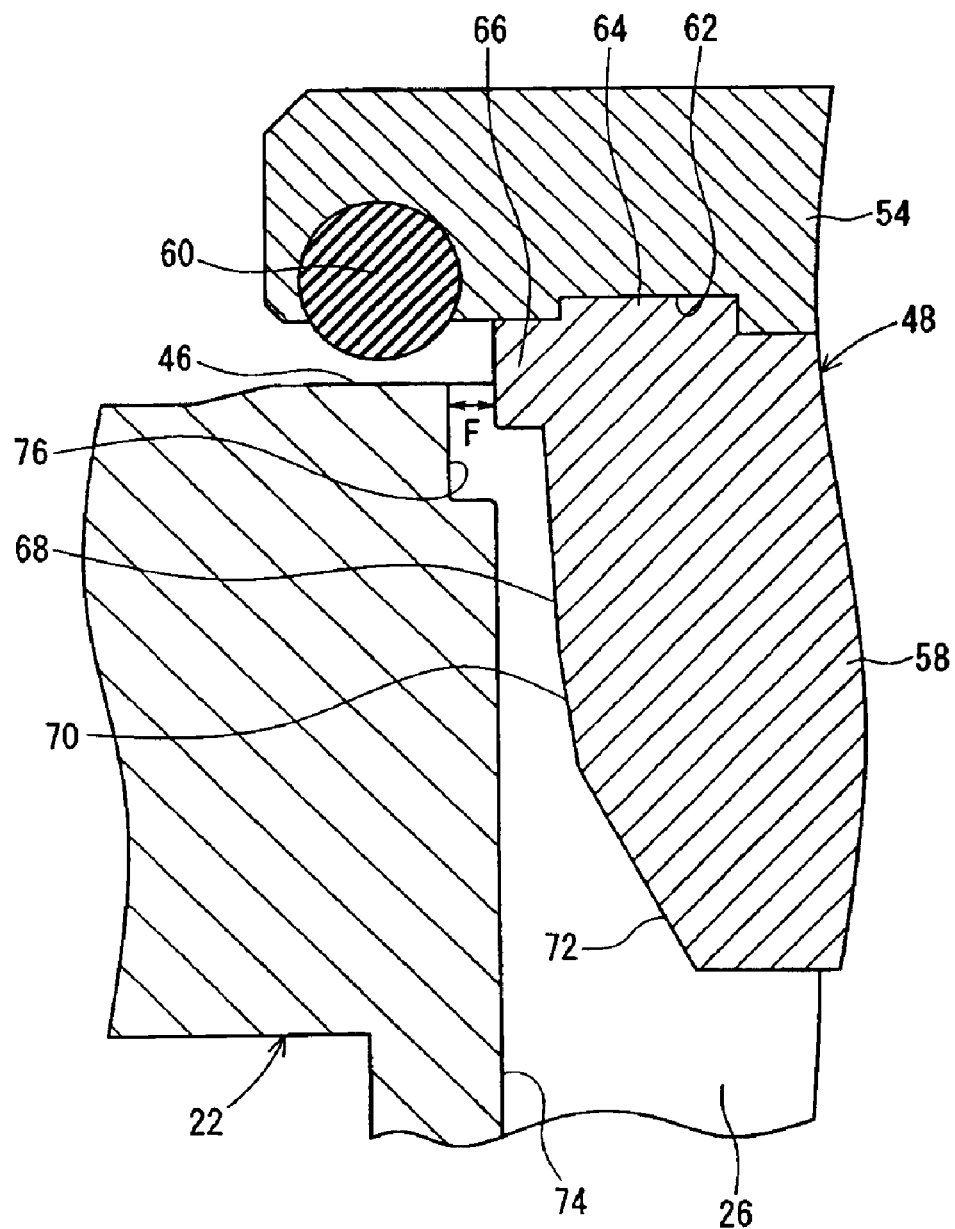
FIG. 4 is, with partial omission, a vertical sectional view when the valve plug shown in FIG. 3 is separated from a valve seat.

As shown in FIG. 4, the annular projection 66 of the nose 58 is separated by a predetermined distance from the annular recess 76 to provide a clearance F. The annular projection 66 is held in a non-contact state. Similarly, the first to third tapered sections 68, 70, 72 are also held in a non-contact state in which the first to third tapered sections 68, 70, 72 are separated by predetermined distances from the inner wall surface 74 of the chamber port 26 to provide clearances.

As shown in FIGS. 1 and 2, a bore 80 is formed at a substantially central portion of the plate 54. A lower portion of the shaft 52 is fitted thereto by an annular holding member 82.

A substantially cylindrical shaft guide 84 is inserted through the outer circumference of the shaft 52 and abuts against the upper surface of the holding member 82. A spring seat 86 is connected to the lower end of the shaft guide 84 on the outer circumferential side thereof. The shaft guide 84 is arranged on the upper surface of the plate 54 of the valve plug 48 by the spring seat 86 by the aid of the holding member 82. A first spring member 88 is interposed between the spring seat 86 and the step section 34 of the bonnet 24 for urging the valve plug 48 in the direction to press the valve plug 48 against the valve seat 46.

Similarly, a second spring member 90 is arranged on the spring seat 86 on the outer circumferential side on which the first spring member 88 is arranged. The second spring member 90 is interposed between the spring seat 86 and the lower surface of the bonnet 26. The second spring member 90 urges the valve plug 48 in the direction to press the valve plug 48 against the valve seat 46.

A pair of disk-shaped bellows holders 92a, 92b (see FIG. 1) are provided on the upper surface of the plate 54 and the lower surface of the bonnet 24, respectively, in the valve body 22. A bellows 94 made of metal is installed between the plate 54 and the bonnet 24 by the bellows holders 92a, 92b. The bellows 94 surrounds the valve mechanism 30 and the first and second spring members 88, 90.

Accordingly, the dust or the like generated, for example, from the valve mechanism 30 disposed in the valve body 22, is not leaked into the fluid passage (not shown) via the chamber port 26 and the pump port 28. On the other hand, the interior of the valve mechanism 30 is protected from the dust or the like contained in the pressure fluid flowing through the chamber port 26 and the pump port 28.

The piston 50 is displaceable in the axial direction in the piston chamber 96 formed in the bonnet 24. The piston 50 is connected to the upper end of the shaft 52 inserted into a through-hole 98 of the bonnet 24 by an annular washer 100 and a fixing nut 102.

A recess 104 is formed by a predetermined depth on the upper surface of the piston 50 and is communicated with the through-hole 98. Accordingly, when the upper end of the shaft 52 is tightened by the fixing nut 102, the fixing nut 102 is accommodated in the recess 104. The fixing nut 102 does not protrude from the upper surface of the piston 50.

A piston packing 106 and a guide ring 108 are installed to annular grooves in the outer circumferential surface of the piston 50.

The piston chamber 96 is formed between the lower surface of the piston 50 and the bonnet 24. The piston chamber 96 comprises a first piston chamber 110 communicating with the fluid supply port 40, and a second piston chamber 112 formed between the upper surface of the piston 50 and the lid 44 installed to the upper surface of the bonnet 24. When the pressure fluid is supplied to the first piston chamber 110 from the fluid supply port 40 via the unillustrated fluid tube, the piston 50 is displaced upwardly in the axial direction. During this process, the air-tightness in the first piston chamber 110 is retained by the piston packing 106. The second piston chamber 112 always communicates with the atmospheric air via the ventilation hole 42 of the lid 44.

The vacuum regulating valve 20 according to the present invention is basically constructed as described above. Next, its operation, function, and effect will be explained.

At first, a procedure will be explained in detaching the nose 58 connected to the lower surface of the plate 54 of the valve plug 48.

As shown in FIG. 1, the screw members 56 screwed in the nose 58 connected to the plate 54 are rotated and loosened. Accordingly, as shown in FIG. 2, the screw members 56 are detached from the plate 54, and the nose 58 can be separated from the lower surface of the plate 54.

The maximum outer circumferential diameter A of the nose 58 is smaller than the inner circumferential diameter B of the chamber port 26 which the valve plug 48 faces. Therefore, the removed nose 58 can be taken out through the chamber port 26.

Therefore, when the nose 58 is periodically maintained or when the nose 58 is exchanged after long use, it is unnecessary to perform a complicated operation such that the bonnet 24 is detached from the upper portion of the valve body 22 and that the nose 58 is removed. Thus, the nose 58 can be easily detached from the valve body 22 to perform maintenance operation or exchange operation.

When the detached nose 58 is connected to the plate 54, the nose 58 is inserted into the chamber port 26 so that the end surface of the nose 58 on which the engaging projection 64 is formed is directed upwardly. The engaging projection 64 of the nose 58 is engaged with the engaging groove 62 of the plate 54 formed at the position facing the engaging projection 64.

That is, when the engaging projection 64 is engaged with the engaging groove 62, the axial center of the plate 54 can be coincident with the axial center of the nose 58 easily and reliably. Therefore, the nose 58 can be connected with the plate 54 while positioned with respect to the plate 54 to function as a single valve plug 48.

An explanation will be made about the operation, function, and effect of the vacuum regulating valve 20 having the valve plug 48 with the nose 58 connected to the plate 54 as described above.

A pilot pressure (for example, compressed air) is supplied from an unillustrated pressure fluid supply source into the first piston chamber 110 via the unillustrated fluid tube connected to the fluid supply port 40.

The piston 50 is displaced upwardly in the axial direction by the pilot pressure. During this process, the fluid in the second piston chamber 112 is discharged to the outside via the ventilation hole 42 by the pressing action of the piston 50.

The shaft 52 connected to the piston 20 is displaced upwardly together with the piston 50 against the spring forces of the first and second spring members 88, 90.

When the valve plug 48 connected to the lower portion of the shaft 52 is displaced upwardly, the seal member 60 of the plate 54 is separated from the valve seat 46 to give the valve-opening state in which the chamber port 26 communicates with the interior of the valve body 22. That is, the fluid in the vacuum chamber 25 is sucked via the communication passage 29 of the valve body 22 and the pump port 28 by the vacuum pump 27 connected to the pump port 28.

An explanation will now be made in detail about the operation performed in the period ranging from the valve-closed state in which the valve plug 48 is seated on the valve seat 46 to the valve-opening state after the valve plug 48 is displaced upwardly in the axial direction by the pressure fluid.

At first, as shown in FIG. 3, the lower surface of the plate 54, to which the nose 58 is installed, abuts against the valve seat 46 of the valve body 22 to close the chamber port 26. The air-tightness of the chamber port 26 and the interior of the valve body 22 is reliably retained by the seal member 60 installed to the plate 54.

Subsequently, as shown in FIG. 4, when the pilot pressure is supplied to the first piston chamber 110 (see FIG. 1) via the fluid supply port 40 (see FIG. 1), the valve plug 48 is separated from the valve seat 46 in the axial direction, i.e., the seal member 60 of the plate 54 is slightly separated from the valve seat 46. In this state, the chamber port 26 communicates with the interior of the valve body 22 via the clearance F (see FIG. 4) formed between the annular recess 76 of the chamber port 26 and the annular projection 66 of the nose 58.

The flow passage formed by the clearance F is narrower than the flow passage in the valve-opening state in which the valve plug 48 is displaced upwardly and the nose 58 is completely displaced into the valve body 22 from the interior of the chamber port 26. Therefore, the flow rate of the fluid flowing between the chamber port 26 and the valve body 22 via the clearance F is small.

The annular projection 66 is separated from the annular recess 76 by the predetermined distance. Therefore, the chamber port 26 communicates with the interior of the valve body 22 substantially simultaneously with the upward displacement of the valve plug 48 to separate the seal member 60 from the valve seat 46. That is, in this arrangement, the chamber port 26 is closed only by the plate 54. Therefore, the chamber port 26 communicates with the interior of the valve body 22 substantially simultaneously with the upward movement of the valve plug 48 having the plate 54.

Figure 5:
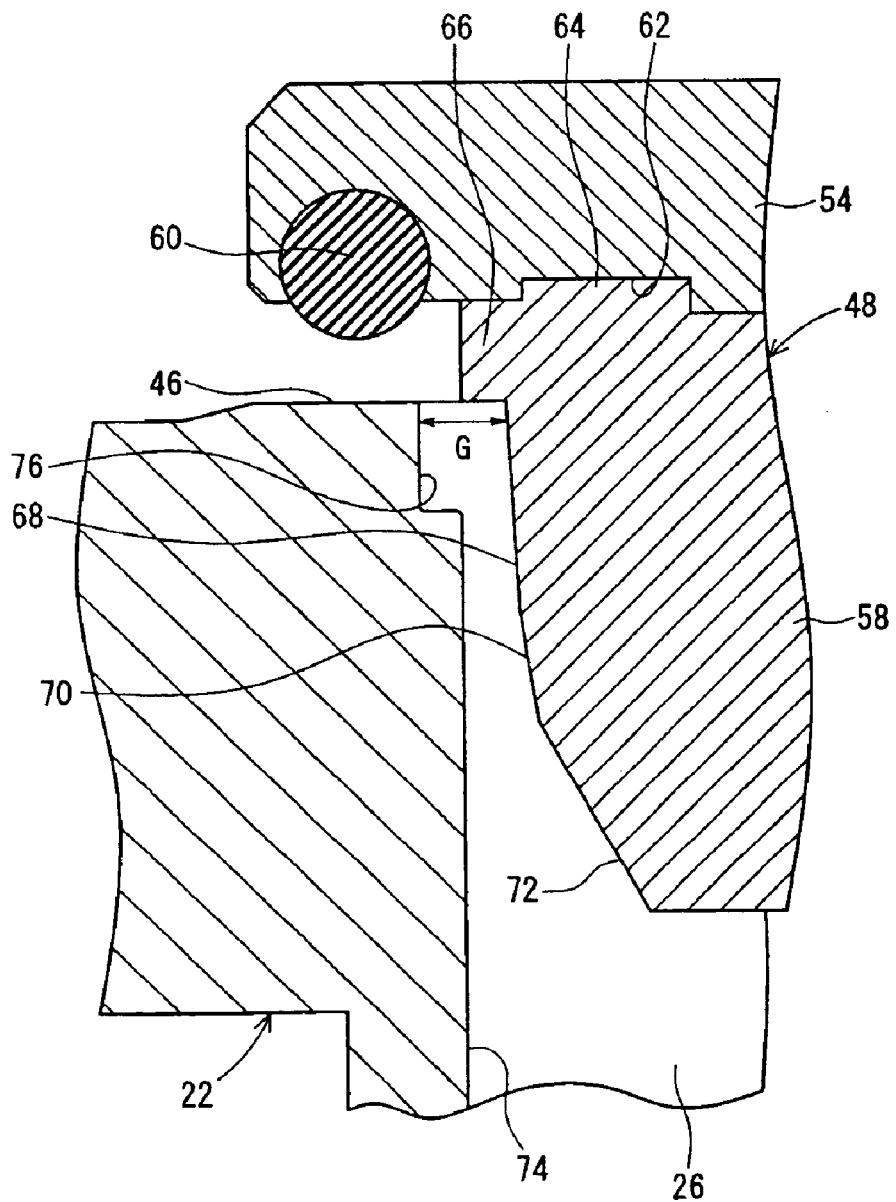
FIG. 5 is, with partial omission, a vertical sectional view when the valve plug shown in FIG. 4 is displaced upwardly.

Subsequently, as shown in FIG. 5, when the valve plug 48 is further displaced upwardly, the chamber port 26 communicates with the interior of the valve body 22 via the clearance G between the annular recess 76 of the chamber port 26 and the first tapered section 68 of the nose 58.

In this situation, the diameter of the first tapered section 68 is reduced radially inwardly from the annular projection 66. Therefore, the clearance G (see FIG. 5) formed between the annular recess 76 and the first tapered section 68 is larger than the clearance F (see FIG. 4) between the annular recess 76 and the annular projection 66 (F<G). Accordingly, the flow rate of the fluid flowing between the chamber port 26 and the interior of the valve body 22 via the clearance G is increased, compared with the flow rate between the annular recess 76 and the annular projection 66.

Figure 6:
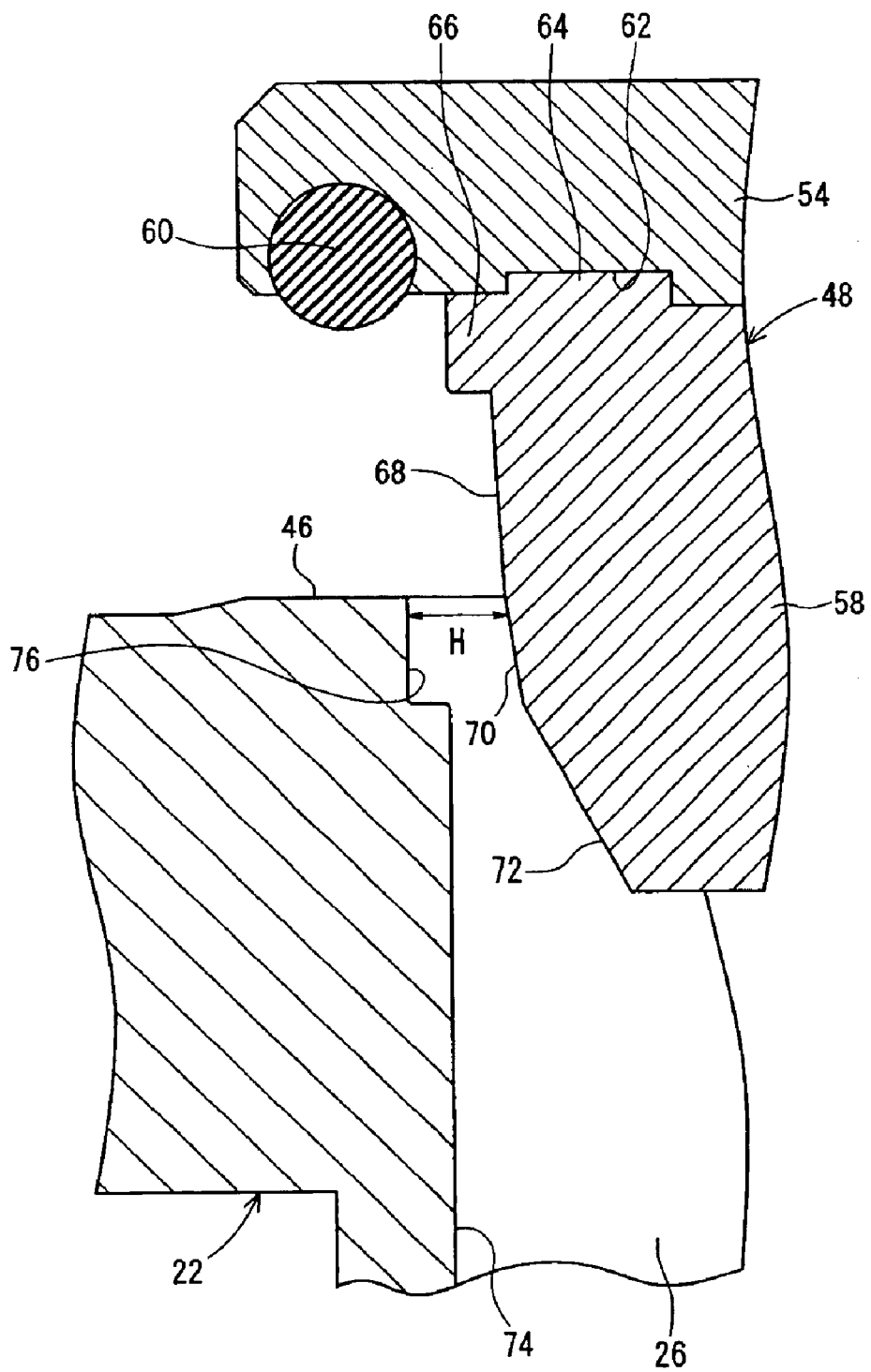
FIG. 6 is, with partial omission, a vertical sectional view when the valve plug shown in FIG. 5 is further displaced upwardly.

Subsequently, as shown in FIG. 6, when the valve plug 48 is further displaced upwardly, the chamber port 26 communicates with the interior of the valve body 22 via the clearance H between the annular recess 76 of the chamber port 26 and the second tapered section 70 of the nose 58.

The second tapered section 70 has the tapered shape in which the angle of inclination is larger than that of the first tapered section 68. Therefore, the clearance H (see FIG. 6) between the annular recess 76 and the second tapered section 70 is larger than the clearance G (see FIG. 5) between the annular recess 76 and the first tapered section 68 (G<H). Accordingly, the flow rate into the chamber port 26 and the interior of the valve body 22 via the clearance H is further increased, compared with the flow rate between the annular recess 76 and the first tapered section 68.

Figure 7:
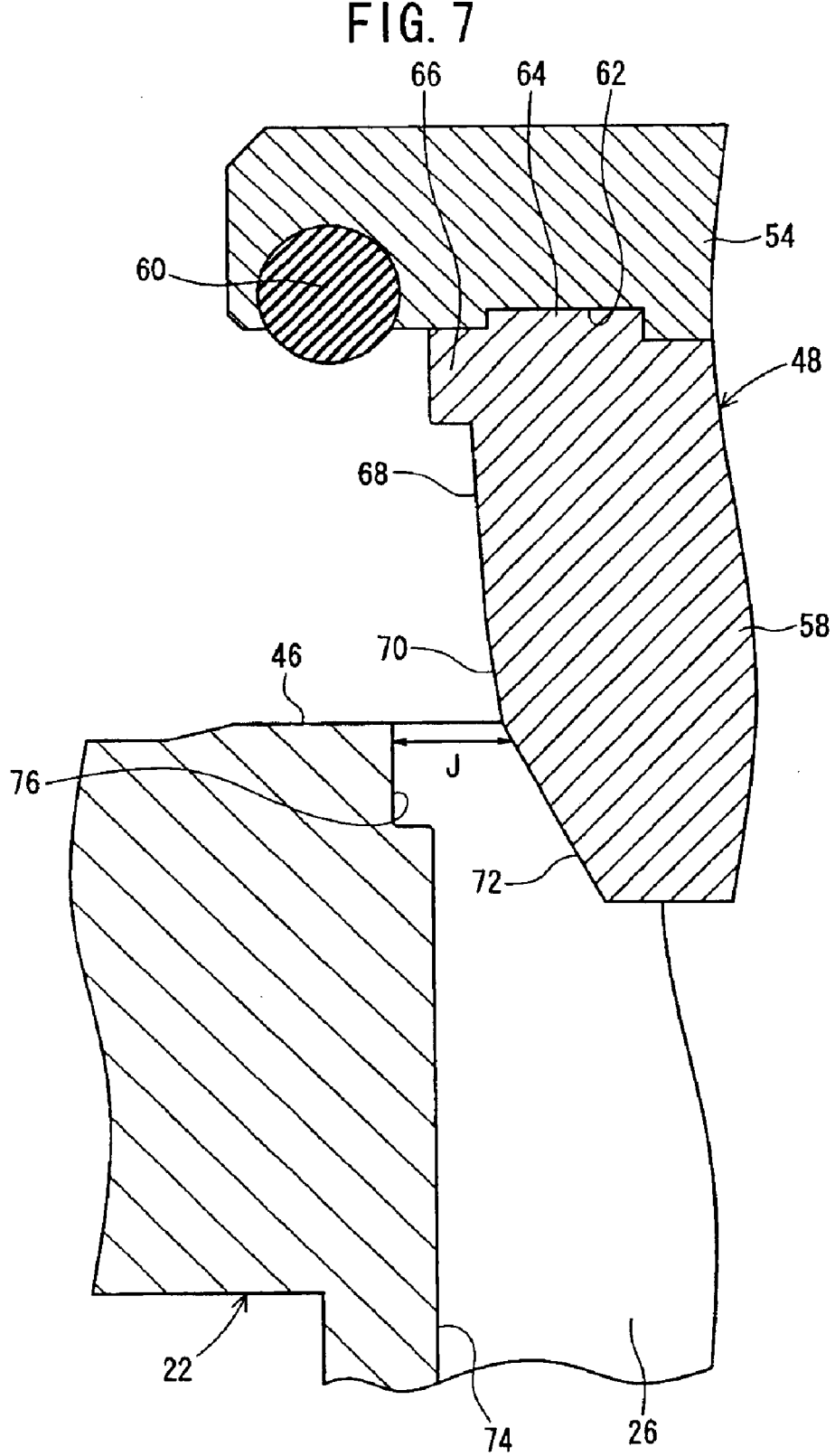
FIG. 7 is, with partial omission, a vertical sectional view when the valve plug shown in FIG. 6 is still further displaced upwardly.
Figure 8:
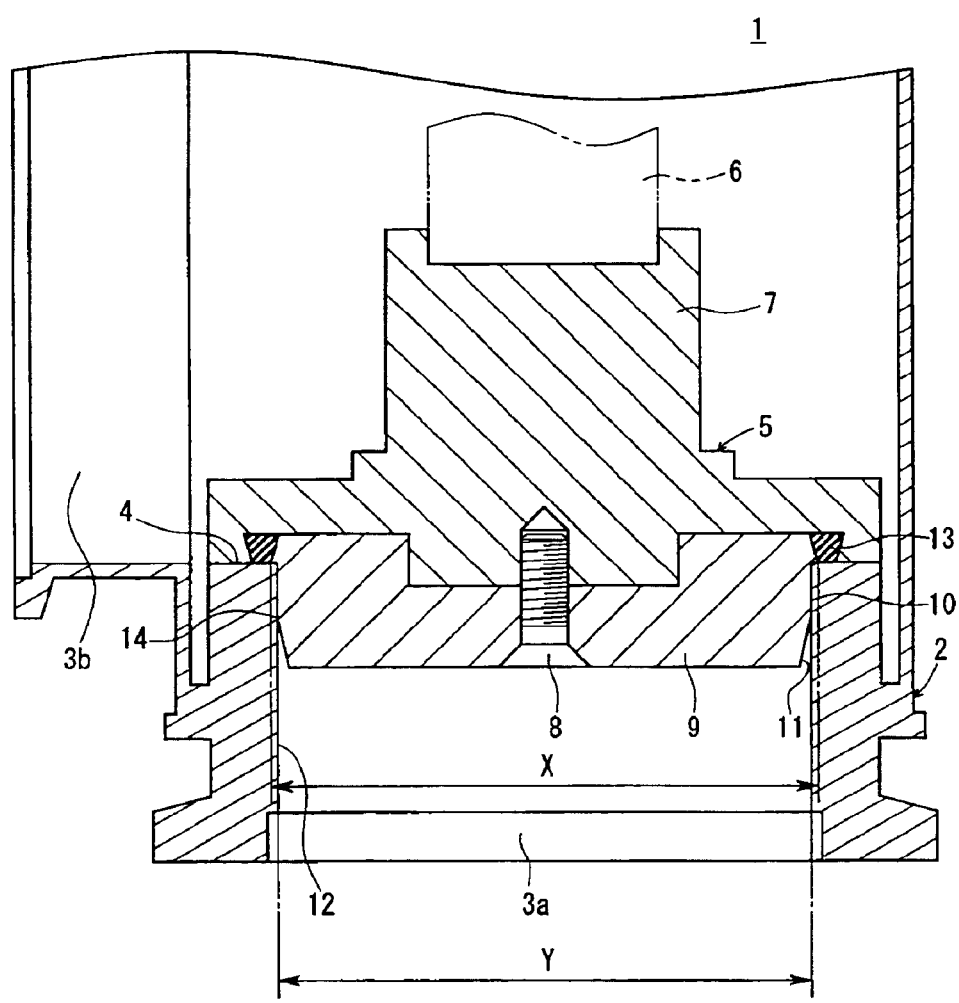
FIG. 8 is, with partial omission, a vertical sectional view illustrating a valve plug of a conventional vacuum regulating valve.
Figure 9:
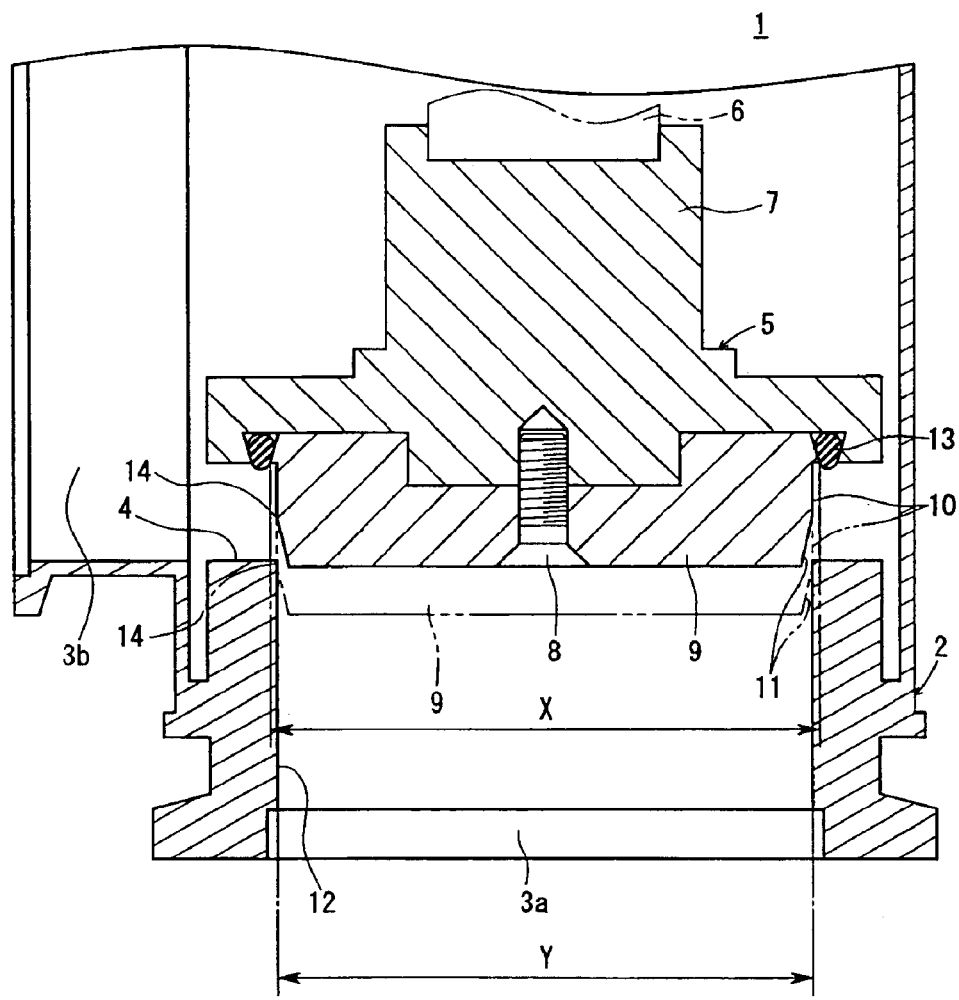
FIG. 9 is, with partial omission, a vertical sectional view illustrating the valve plug shown in FIG. 8.

Subsequently, as shown in FIG. 7, when the valve plug 48 is further displaced upwardly, the chamber port 26 communicates with the interior of the valve body 22 via the clearance J between the annular recess 76 of the chamber port 26 and the third tapered section 72 of the nose 58.

In this arrangement, the third tapered section 72 has the tapered shape in which the angle of inclination is still larger than that of the second tapered section 70. Therefore, the clearance J (see FIG. 7) between the annular recess 76 and the third tapered section 72 is larger than the clearance H (see FIG. 6) between the annular recess 76 and the second tapered section 70 (H<J). Accordingly, the flow rate via the clearance J is further increased, compared with the flow rate between the annular recess 76 and the second tapered section 70.

That is, the clearance is provided between the inner wall surface 74 of the chamber port 26 and the outer circumferential surface of the nose 58 by the predetermined distance to be the non-contact state when the valve plug 48 is seated on the valve seat 46. Accordingly, the chamber port 26 communicates with the interior of the valve body 22 substantially simultaneously with the separation of the valve plug 48 from the valve seat 46.

As a result, it is possible to control the flow rate of the fluid flowing between the nose 58 and the inner wall surface 74 substantially simultaneously with the separation of the valve plug 48 from the valve seat 46 by the pilot pressure. Therefore, it is possible to highly accurately control the flow rate of the fluid flowing between the chamber port 26 and the pump port 28.

The plurality of steps are formed on the outer circumferential surface of the nose 58, in which the diameter of the outer circumferential surface of the nose 58 is gradually reduced in the direction to separate from the plate 54. Therefore, when the valve plug 48 is displaced upwardly to give the valve-opening state, the flow passage is gradually enlarged by the clearances F to J (see FIGS. 4 to 7) between the outer circumferential surface of the nose 58 and the inner wall surface 74 of the chamber port 26 (F<G<H<J). As a result, it is possible to gradually increase the flow rate between the chamber port 26 and the pump port 28, and the large amount of the fluid does not flow suddenly. Therefore, sudden change of the flow rate is not caused even when the valve plug 48 is separated from the valve seat 46.

When the angles of inclination of the first to third tapered sections 68, 70, 72 are set to be arbitrary angles according to the relationship (C<D<E) in which the angles are increased in the order of the first angle of inclination C, the second angle of inclination D, and the third angle of inclination E as shown in FIG. 3, it is possible to adjust the flow rate between the inner wall surface 74 of the chamber port 26 and the first to third tapered sections 68, 70, 72.

In order to achieve the valve-closed state in which the chamber port 26 is closed by the valve plug 48, the supply of the pilot pressure to the first piston chamber 110 is stopped, and thus the valve plug 48 is pressed downwardly by the spring forces of the first and second spring members 88, 90 on the spring seat 86. The shaft 52 connected to the valve plug 48 is displaced downwardly together with the piston 50, and the lower surface of the plate 54 of the valve plug 48 is seated on the valve seat 46. Accordingly, the seal member 60 abuts against the valve seat 46 to give the valve-closed state in which the chamber port 26 is closed. The communication between the chamber port 26 and the pump port 28 is blocked.

In this arrangement, the outer circumferential surface of the nose 58 has the plurality of steps in which the diameter is gradually reduced in the direction to separate from the plate 54. Therefore, the clearance between the inner wall surface 74 of the chamber port 26 and the outer circumferential surface of the nose 58 of the valve plug 48 is gradually narrowed as the valve plug 48 approaches the valve seat 46, reversely with respect to the case in which the valve plug 48 is displaced upwardly to give the valve-opening state. As a result, the flow rate between the chamber port 26 and the pump port 28 is gradually decreased.

As described above, in the embodiment of the present invention, the nose 58 is connected to the plate 54 of the valve plug 48 by the screw members 56, and the maximum outer circumferential diameter A of the nose 58 is smaller than the inner circumferential diameter B of the chamber port 26. Therefore, the nose 58 alone can be taken out of the chamber port 26. As a result, the nose 58 can be detached or attached easily. Accordingly, it is possible to easily perform the maintenance operation, and it is possible to improve the efficiency of the operation.

As described above, in the embodiment of the present invention, the clearances having the predetermined distances are provided between the inner wall surface 74 of the chamber port 26 and the outer circumferential surface of the nose 58 of the valve plug 48 to be the non-contact state. Accordingly, it is possible to connect the chamber port 26 and the interior of the valve body 22 substantially simultaneously with the separation of the valve plug 48 from the valve seat 46. As a result, it is possible to instantaneously control the flow rate of the fluid flowing through the communication passage 29 highly accurately.

The outer circumferential surface of the nose 58 has the plurality of steps in which the diameter is reduced in the direction to separate from the plate 54. Accordingly, the flow rate of the negative pressure fluid flowing from the chamber port 26 via the communication passage 29 to the pump port 28 can be changed gradually or stepwise. Therefore, sudden suction by the negative pressure fluid is suppressed in the vacuum chamber 25. As a result, it is possible to gradually produce a vacuum in the vacuum chamber 25.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A vacuum regulating valve comprising:
   a valve body which has a first port and a second port connected to an upstream side and a downstream side of a fluid passage, respectively, and which has a communication passage between said first port and said second port;
   a valve plug which opens/closes said communication passage by being displaced in an axial direction of said valve body by a pressure fluid; and
   a nose provided on said valve plug and having a circumferential surface facing an inner wall surface of said first port,
   wherein said nose has an outer circumferential diameter which is smaller than an inner circumferential diameter of said inner wall surface, so that said nose is detachable from said valve plug through said first port connected to a vacuum chamber, and
   wherein said circumferential surface of said nose is provided with a straight section and a plurality of tapered sections having diameters gradually reduced in a displacement direction in which said valve plug is seated on a valve seat.

2. The vacuum regulating valve according to claim 1, wherein said nose has an engaging projection protruding by a predetermined length formed on an end surface facing a plate of said valve plug, said plate being connected to a shaft, wherein an engaging groove recessed by a predetermined depth is formed on an end surface of said plate facing said engaging projection.

3. The vacuum regulating valve according to claim 2, wherein said engaging projection is positioned by being engaged with said engaging groove when said nose is connected to said plate.

4. The vacuum regulating valve according to claim 1, wherein said plurality of tapered sections includes a first tapered section adjacent to said straight section, a second tapered section adjacent to said first tapered section, and a third tapered section adjacent to said second tapered section.

5. The vacuum regulating valve according to claim 4, wherein said second tapered section has an angle of inclination which is larger than an angle of inclination of said first tapered section, and which is smaller than an angle of inclination of said third tapered section (C<D<E).

6. The vacuum regulating valve according to claim 1, wherein a distance between said circumferential surface of said nose and said inner wall surface of said first port is increased stepwise while said valve plug is displaced from a position in a valve-closed state to a position in a valve-opening state.

7. The vacuum regulating valve according to claim 1, wherein an annular recess is formed on said inner wall surface and is expanded radially outwardly, and said straight section is formed at a position facing said annular recess when said valve plug is seated on a valve seat.

8. The vacuum regulating valve according to claim 4, wherein an annular recess is formed on said inner wall surface and is expanded radially outwardly, and clearances between said annular recess and said first tapered section, said second tapered section, and said third tapered section, respectively, are enlarged stepwise.

9. A vacuum regulating valve comprising:
   a valve body which has a first port and a second port connected to an upstream side and a downstream side of a fluid passage, respectively, and which has a communication passage between said first port and said second port;
   a valve plug which opens/closes said communication passage by being displaced in an axial direction of said valve body by a pressure fluid; and
   a nose provided on said valve plug and having a circumferential surface facing an inner wall surface of said first port,
   wherein said nose has an outer circumferential diameter which is smaller than an inner circumferential diameter of said inner wall surface, so that said nose is detachable from said valve plug through said first port connected to a vacuum chamber,
   wherein a distance between said circumferential surface of said nose and said inner wall surface of said first port is increased stepwise while said valve plug is displaced from a position in a valve-closed state to a position in a valve-opening state.

10. The vacuum regulating valve according to claim a, wherein said nose has an engaging projection protruding by a predetermined length formed on an end surface facing a plate of said valve plug, said plate being connected to a shaft, wherein an engaging groove recessed by a predetermined depth is formed on an end surface of said plate facing said engaging projection.

11. The vacuum regulating valve according to claim 10, wherein said engaging projection is positioned by being engaged with said engaging groove when said nose is connected to said plate.

12. The vacuum regulating valve according to claim 9, wherein said circumferential surface of said nose is provided with a straight section and a plurality of tapered sections having diameters gradually reduced in a displacement direction in which said valve plug is seated on a valve seat.

13. The vacuum regulating valve according to claim 12, wherein said plurality of tapered sections includes a first tapered section adjacent to said straight section, a second tapered section adjacent to said first tapered section, and a third tapered section adjacent to said second tapered section.

14. The vacuum regulating valve according to claim 13, wherein said second tapered section has an angle of inclination which is larger than an angle of inclination or said first tapered section, and which is smaller than an angle of inclination of said third tapered section (C<D<E).

15. The vacuum regulating valve according to claim 12, wherein an annular recess is formed on said inner wall surface and is expanded radially outwardly, and said straight section is formed at a position facing said annular recess when said valve plug is seated on a valve seat.

16. The vacuum regulating valve according to claim 13, wherein an annular recess is formed on said inner wall surface and is expanded radially outwardly, and clearances between said annular recess and said first tapered section, said second tapered section, and said third tapered section, respectively, are enlarged stepwise.

* * * * *